United States Patent
Carroll et al.

(10) Patent No.: US 6,640,167 B1
(45) Date of Patent: Oct. 28, 2003

(54) METHOD OF DETECTING AND MANAGING SENSOR FAULT FOR SAFETY-CRITICAL ROAD-WHEEL POSITION IN VEHICLE STEER-BY-WIRE SYSTEMS

(75) Inventors: Deanna L. Carroll, Westland, MI (US); Bing Zheng, Dublin, OH (US); Mary Y. Huang, Troy, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/374,820

(22) Filed: Feb. 25, 2003

(51) Int. Cl.$^7$ .............................................. G01M 17/00
(52) U.S. Cl. ............................ 701/34; 701/43; 701/42; 701/41
(58) Field of Search ............................... 701/1, 29, 34, 701/36, 41, 42, 43; 180/443, 446, 447

(56) References Cited

U.S. PATENT DOCUMENTS

| | | |
|---|---|---|
| 5,276,620 A | 1/1994 | Bottesch |
| 5,554,969 A | 9/1996 | Eguchi |
| 5,754,963 A | 5/1998 | Nunneley et al. |
| 6,085,127 A | 7/2000 | Vos |
| 6,208,923 B1 | 3/2001 | Hommel |
| 6,269,903 B1 | 8/2001 | Bohner et al. |
| 6,279,674 B1 | 8/2001 | Lissel et al. |
| 6,389,338 B1 | 5/2002 | Chandy et al. |
| 6,456,914 B1 | 9/2002 | Fratini et al. |

OTHER PUBLICATIONS

Patent Application Publication No.: US 2002/0033301 A1, Publication Date: Mar. 21, 2002, Inventor: Bernd Clephas, entitled: Additional Fallback Level For The Failure Of, For Example, Angle Sensors, For Steer–By–Wire Systems Not Having Mechanical/Hydraulic Fallback Connection.

*Primary Examiner*—Richard M. Camby
(74) *Attorney, Agent, or Firm*—Brinks Hofer Gilson & Lione

(57) ABSTRACT

The present invention involves a system and method of implementing a fault detection and management system for road wheel position sensor faults of a vehicle steer-by-wire system. The method comprises providing primary and secondary road wheel position sensors configured to generate road wheel angle signals indicative of a road wheel angle to a microprocessor. The primary road wheel sensor is in an active control mode and the secondary road wheel sensor is in a stand-by control mode within the steer-by-wire system. The method further includes receiving road wheel angle signals from the primary and secondary sensors, and detecting a fault based on the road wheel angle signals from the primary and secondary sensors. The method further includes calculating an estimated road wheel angle based on a vehicle variable and comparing the primary sensor signal with the estimated road wheel angle. The method further includes managing control of the system based on the comparison of the primary sensor signal with the estimated road wheel angle.

27 Claims, 3 Drawing Sheets

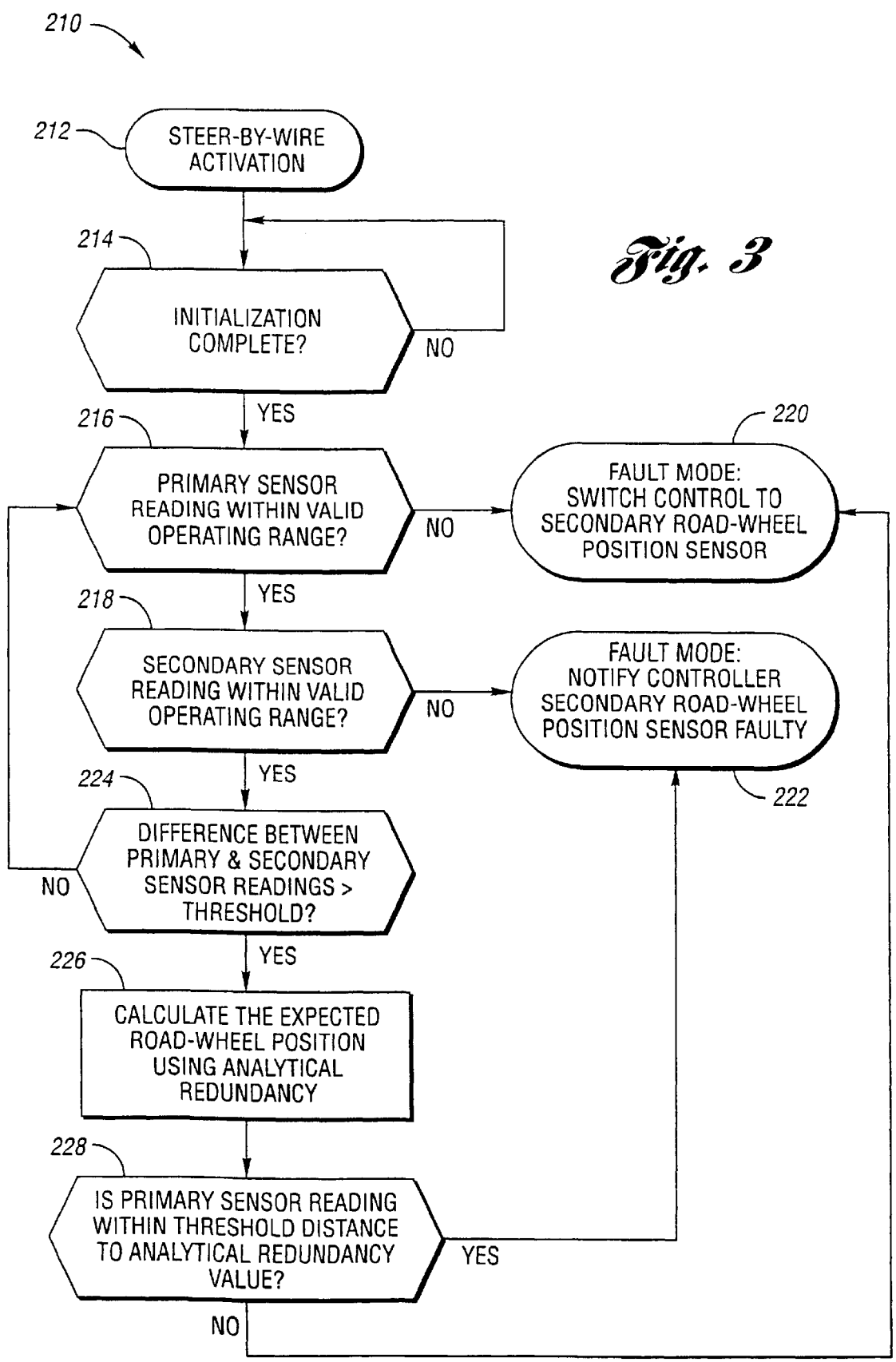

METHOD OF DETECTING AND MANAGING SENSOR FAULT FOR SAFETY-CRITICAL ROAD-WHEEL POSITION IN VEHICLE STEER-BY-WIRE SYSTEMS

BACKGROUND OF THE INVENTION

The present invention relates to a system and method of implementing fault detection and management strategy for sensor faults of a vehicle steer-by-wire system.

Steer-by-wire systems are becoming more common in the automotive industry. Steer-by-wire systems replace the mechanical linkage between a steering wheel and road wheels of a vehicle with electrical connections and components including road wheel actuators, road wheel position sensors, steering wheel position sensors, power electronic drivers, and electronic control units.

Due to the criticality of steering functionality, it is important that system designs provide safe handling of failures. For instance, during normal operation, a vehicle steer-by-wire system may experience component failure, e.g., a sensor fault, and should be capable of responding safely. Currently, many steer-by-wire systems include a redundancy of sensors, e.g., triple redundancy, to enable detection, isolation and management of faults including sensor faults. A vehicle steer-by-wire system having triple redundant sensors include three sensors configured to input data of one, vehicle variable, e.g., road wheel position. As such, one of the sensors may experience a fault which could be easily detected by comparison of the signals generated by all three sensors. Although adequate, a triple redundancy strategy involves relatively high costs and large volume density within a vehicle.

Steer-by-wire systems with double redundancy sensors typically have relatively limited capability. For example, a double redundancy fault detection system may only be capable of detecting a limited set of faults where the faulted sensor value is outside of its normal operating window. Thus, common faults such as drifting are still a concern in double redundancy systems.

BRIEF SUMMARY OF THE INVENTION

Thus, it is one aspect of the present invention to provide a fault detection and management strategy for road wheel position sensor faults of a vehicle steer-by-wire system to reduce volume density and costs.

It is another aspect of the present invention to provide a fault detection and management strategy for road wheel position sensor faults of a vehicle steer-by-wire system to reduce the redundancies.

It is yet another aspect of the present invention to provide a fault detection and management strategy for road wheel position sensor faults of a vehicle steer-by-wire system having a reduced number of sensors while maintaining fault detection capabilities of a triple redundancy system.

One method of the present invention includes providing primary and secondary road wheel sensors configured to generate road wheel angle signals indicative of a road wheel angle to a microprocessor. In this embodiment, the primary road wheel sensor is in an active control mode and the secondary road wheel sensor is in a stand-by control mode within the steer-by-wire system. The method further includes receiving road wheel angle signals from the primary and secondary sensors and detecting a fault based on the road wheel angle signals from the primary and secondary sensors. The method further includes calculating an estimated road wheel angle based on a vehicle variable and comparing the primary sensor signal with the estimated road wheel angle. The method further includes managing control of the system based on the comparison of the primary sensor signal with the estimated road wheel angle.

Further objects, features and advantages of the invention will become apparent from consideration of the following description and the appended claims when taken in connection with the accompanying drawings.

BRIEF DESCRIPTION OF THE DRAWINGS

FIG. 3 is a flow-chart depicting one method of implementing the fault detection and management strategy for road wheel position sensor faults of the steer-by-wire system in FIG. 2.

DETAILED DESCRIPTION OF THE INVENTION

The present invention provides a system and method for a fault detection and management strategy for road wheel position sensor faults within a vehicle steer-by-wire system. The system and method of the present invention reduces the redundancy or number of sensors used within the steer-by-wire system thereby lessening volume density and costs of the system while maintaining the capabilities of a triple redundancy system. The present invention detects faults occurring inside or outside the normal operating window of the sensors. Thus, faults such as sensor drift may be detected with only two sensors. Generally, the system detects a fault based on signals from the two sensors and compares one of the signals with an estimated road wheel angle which is based on mathematical relationships concerning yaw rate or lateral acceleration of the vehicle. Based on the comparison, one of the two sensors is isolated for maintenance. Then, the system manages the fault based on the comparison. The present invention provides a simple, efficient, and low cost way of detecting road wheel position sensor faults within a vehicle steer-by-wire system.

Figure 1:
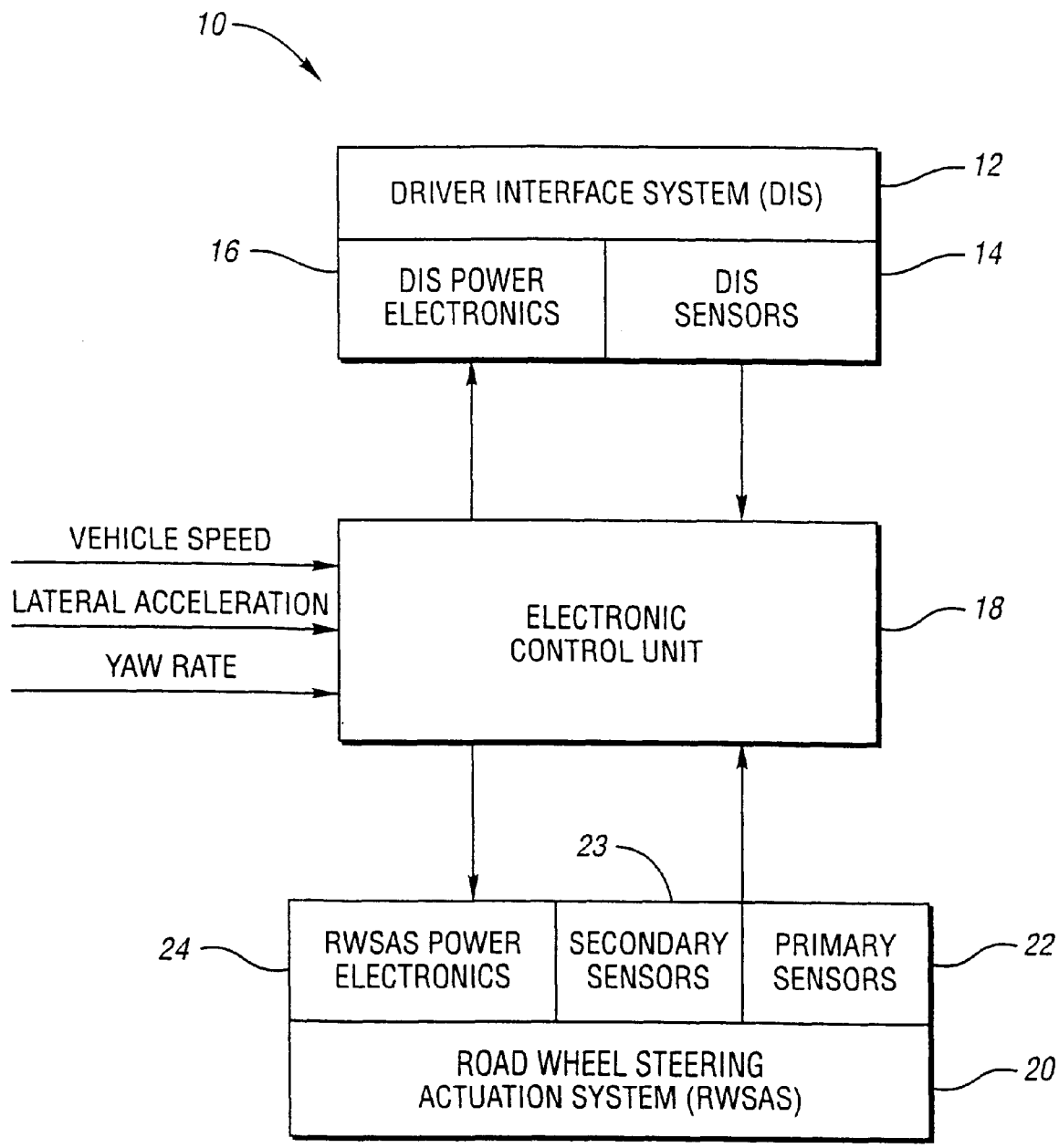
FIG. 1 is a schematic diagram of an assembly for a vehicle steer-by-wire system implementing a fault detection and management strategy in accordance with one embodiment of the present invention.

FIG. 1 illustrates a schematic diagram of a vehicle steer-by-wire system 10 implementing a fault detection and management strategy in accordance with one embodiment of the present invention. As shown, steer-by-wire system 10 includes a driver interface system (DIS) 12 including a steering wheel (not shown), driver interface sensors 14, and driver interface power electronics 16. In this embodiment, the driver interface sensors 14 are disposed in communication with the steering wheel, or a joy stick, or any other suitable means for a driver to control or maneuver a vehicle. The sensors 14 are capable of sensing the angular position of the steering wheel. The driver interface power electronics 16 include electronic components capable of converting command signals from the controller to an electrical signal capable of driving the actuators providing feel to the driver of the vehicle e.g., receivers, transmitters, actuators, and other suitable components. In this embodiment, the driver interface system 12 senses a steering wheel angle of the vehicle, generates a steering wheel angle signal indicative of the steering wheel angle and provides driver feel to the driver of the vehicle.

As shown in FIG. 1, the steer-by-wire system 10 further includes an electronic control unit (ECU) 18 configured to generate a torque signal to rotate road wheels of the vehicle. The electronic control unit includes a processing unit or a microprocessor which incorporates the fault detection and management strategy of the present invention. The electronic control unit (ECU) is configured to receive signals indicative of vehicle variables including lateral acceleration and/or yaw rate. This may be accomplished by implementation of sensors or any other suitable means known in the art. As shown, the ECU 18 is in electrical communication with the driver interface system 12 wherein the driver interface sensors 14 generate driver inputs such as steering wheel angle signals to the ECU 18.

System 10 further includes a road wheel actuating system 20 including road wheel sensors and power electronics and actuator for each front road wheel. For simplicity, FIG. 1 merely shows equipment configuration, e.g., primary and secondary road wheel sensors and power electronics, for one of the road wheels. However, it is to be noted that a plurality of configurations may be implemented in a vehicle. As shown, system 10 includes primary and secondary road wheel sensors 22, 23 and road wheel power electronics 24 in electrical communication with ECU 18. The primary and secondary sensors 22, 23 may be disposed adjacent to and associated with one road wheel of the vehicle to measure road wheel position of the road wheel. Power electronics 24 include electronic components capable of receiving command signals from ECU 18 to provide rotation or movement of the road wheels, e.g., motors, actuators. As shown, road wheel actuating system 20 is in electrical communication with ECU 18 wherein sensors 22, 23 generate and transmit primary and secondary road wheel angle signals, respectively, to ECU 18.

Figure 2:
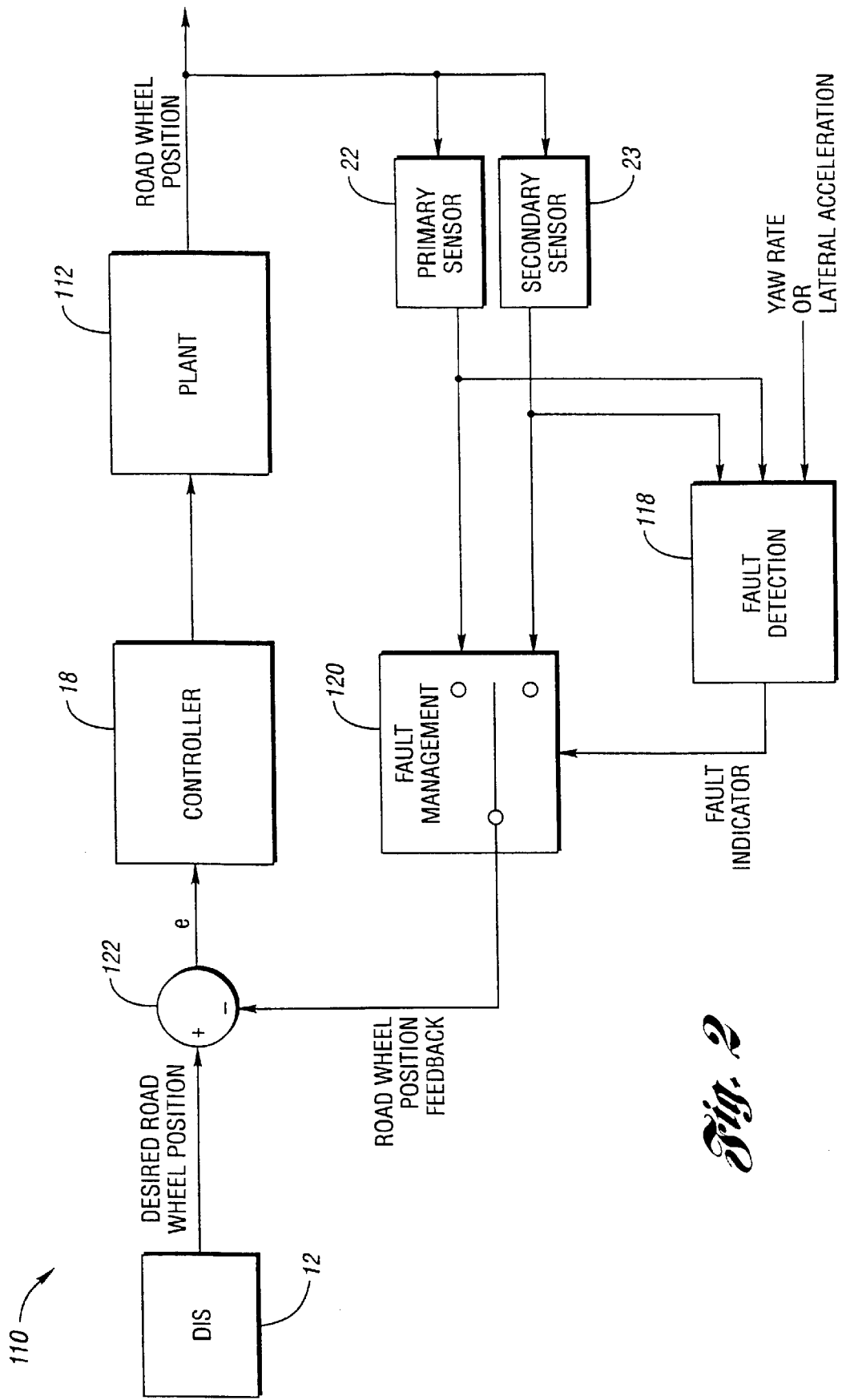
FIG. 2 is a control logic diagram of the steer-by-wire system of FIG. 1 implementing the fault detection and management strategy for road wheel position sensor faults in accordance with one embodiment of the present invention.

FIG. 2 depicts a schematic diagram of a fault detection and management control logic 110 for road wheel position sensor faults of the vehicle steer-by-wire system in FIG. 1. As shown, control logic 110 includes box 112 which refers to the vehicle to which the steer-by-wire system is installed. As also shown, primary and secondary sensors 22, 23 read road wheel angle or position from vehicle 112. In this embodiment, the primary sensor 22 is configured in an active control mode and the secondary sensor 23 is configured in a stand-by control mode. The active control mode is a mode in which the sensor reads and generates a road wheel angle signal which is processed by a processing unit or microprocessor for road wheel control. In this embodiment, the processing unit is within the ECU mentioned above. The stand-by control mode is a mode in which the sensor reads and generates a road wheel angle signal which is processed only for fault detection and backup control. Primary sensor 22 generates a primary road wheel angle signal indicative of a road wheel angle of vehicle 112 to the microprocessor. Secondary sensor 23 generates a secondary road wheel angle signal also indicative of the road wheel angle of vehicle 112 to the microprocessor.

The primary road wheel angle signal and secondary road wheel angle signal are received by fault detection function 118 and fault management function 120 of control logic 110. Fault detection function 118 further receives yaw rate or lateral acceleration of the vehicle 112 by any suitable means, such as a yaw rate or a lateral acceleration sensor. In box 118, the fault detection function detects a fault based on a comparison of the road wheel angle signals from the primary and secondary sensors. Then, the fault detection function 118 calculates an estimated road wheel angle based on one vehicle variable, such as yaw rate or lateral acceleration. Then, the fault detection function 118 compares the primary sensor signal with the estimated road wheel angle. If the difference between the primary sensor signal and the estimated road wheel angle is within a first threshold, then the primary sensor 22 is maintained in the active control mode. If not, then the secondary sensor 23 is switched to the active control mode in box 120 of the fault management function.

The first threshold may be any suitable threshold indicative of sensor fault. Of course, the value of the first threshold may vary depending on the configuration and assembly of the equipment used in the steer-by-wire system. For example, depending on the type of sensor implemented, the first threshold may vary without falling beyond the scope or spirit of the present invention.

The fault management function 120 then calculates a road wheel position feedback to summer 122 based on the signal of the sensor in the active control mode. Summer 122 compares a desired road wheel position from the DIS in box 114 with the measured road wheel position feedback. Summer 122 calculates the difference between the desired road wheel position and the road wheel position feedback and generates an error input signal to the controller or ECU 18 which generates and applies a proportional amount of torque to the vehicle 112 to turn road wheels consistent with the error input signal.

FIG. 3 illustrates one method 210 of implementing a fault detection and management strategy for road wheel position sensor faults for the vehicle steer-by-wire system 10 in FIG. 1 using control logic 110 in FIG. 2. Method 210 includes providing primary and secondary road wheel position sensors configured to generate road wheel angle signals indicative of a road wheel angle to the microprocessor mentioned above. In this embodiment, the primary road wheel sensor is in the active control mode and the secondary road wheel sensor is in stand-by control mode within the steer-by-wire system. As shown, method 210 includes activating the steer-by-wire system in box 212 and completing initialization of the steer-by-wire system in box 214.

Method 210 further includes receiving road wheel angle signals from the primary and secondary sensors. Method 210 further includes determining whether the primary sensor and the secondary sensor are each reading within a valid operating range in boxes 216 and 218, respectively. In box 216, a fault is detected if the primary sensor is not reading within a valid operating window which may include operating range and gradiant. If the primary sensor is not reading within a valid operating window, then the control strategy is switched to a fault mode wherein the secondary sensor is switched to the active control mode. Moreover, it is to be noted that the valid operating window of the primary sensor may include any suitable operating window of a sensor known in the art.

However, if it is determined that the primary sensor reads within the valid operating window, then the system determines whether the secondary sensor reads within the valid operating window in box 218. If the secondary sensor does not read within the valid operating window, then a fault is detected and the strategy is switched in the fault mode wherein the system flags and notifies the controller 18 that the secondary sensor is faulted and requires maintenance in box 222.

As shown, if the secondary sensor signal is determined to be within the valid operating window, then the fault detection function determines the difference between the primary and secondary sensor signals. The difference is compared with a threshold in box 224. If the difference is not greater than the threshold, then no fault is detected and the step of determining whether the primary sensor reading is within the valid operating range is repeated in box 216. If the difference is greater than the threshold, then a fault is detected and an estimated road wheel angle is calculated in box 226 using mathematical relationships (discussed below) based on a vehicle variable such as yaw rate or lateral acceleration of the vehicle. This determines whether one of the sensors is experiencing a fault within its normal operating window, e.g., drifting.

In this embodiment, the method utilizes mathematical relationships including the following equations:

$$m(\dot{V}_y + V_x \Omega_z) = F_{yr} + F_{yf} \cos \delta_f + F_{xf} \sin \delta_f$$

$$I_z \dot{\Omega}_z = l_1 F_{yf} \cos \delta_f - l_2 F_{yr} + l_1 F_{xf} \sin \Omega_f$$

for analytical redundancy, where m is the mass of the vehicle, $V_y$ & $V_x$ are the vehicle velocity components, $F_{yf}$ & $F_{yr}$ are the lateral forces acting on the front and rear tires, $F_{xf}$ is the longitudinal force acting on the front tire, $\delta_f$ is the steer angle of the front wheel, $\Omega_z$ is the yaw velocity, $I_z$ is the mass moment of inertia of the vehicle about the z axis, and $l_1$ & $l_2$ are the distances between the center of gravity and the front and rear axle respectively.

In one embodiment, under steady state conditions using yaw rate measurements this relationship simplifies to:

$$\delta_f = (\Omega_z/V)(L + K_{us} V^2/g),$$

where $L = l_1 + l_2$ and $K_{us}$ is an understeer coefficient of the vehicle by using yaw rate measurements.

In another embodiment, using lateral acceleration measurements under steady state conditions, the relationship simplifies to:

$$\delta_f = (a_y/V^2)(L + K_{us} V^2/g),$$

where $a_y$ is vehicle lateral acceleration by using lateral acceleration measurements.

As shown in box 228, the primary road wheel angle signal is compared to the estimated road wheel angle and it is determined whether the difference is within a threshold. If the difference is within the threshold, then the system manages the fault by flagging and notifying the controller that the secondary sensor is faulted and maintenance is required in box 222. If not, then the secondary sensor is switched to the active control mode in box 220 and the primary sensor is switched to the stand-by control mode. In this embodiment, the threshold may be any threshold indicative of sensor fault, such as sensor drift. For example, the threshold difference in this embodiment is in degrees and is set to declaring a fault whenever the absolute value of the primary sensor value minus the secondary sensor value exceeds 0.1 degree. Moreover, a quadrature encoder with 0.01 degree resolution and an MTS position sensor which has an equivalent resolution of 0.012 degree is implemented herein. The threshold of 0.1 degree was determined as ten times the worst case resolution in this embodiment. Accordingly, other thresholds may be used without falling beyond the scope or spirit of the present invention.

In use, the present invention provides a fault detection and management strategy implementation for a vehicle steer-by-wire system with reduced redundancies while maintaining fault detection capabilities of a triple redundancy system. The present invention provides capabilities of detecting a road wheel position sensor fault either within or outside the sensor's normal operating windows.

While the present invention has been described in terms of preferred embodiments, it will be understood, of course, that the invention is not limited thereto since modifications may be made by those skilled in the art, particularly in light of the foregoing teachings.

What is claimed is:

1. A method of implementing a fault detection strategy for sensor fault of a vehicle steer-by-wire system, the method comprising:
   providing primary and secondary road wheel position sensors configured to generate road wheel angle signals indicative of a road wheel angle to a microprocessor, the primary road wheel sensor being in an active control mode and the secondary road wheel sensor being in a stand-by control mode within the steer-by-wire system;
   receiving road wheel angle signals from the primary and secondary sensors;
   detecting a fault based on the road wheel angle signals from the primary and secondary sensors;
   calculating an estimated road wheel angle based on a vehicle variable;
   comparing the primary sensor signal with the estimated road wheel angle; and
   managing control of the system based on the comparison of the primary sensor signal with the estimated road wheel angle.

2. The method of claim 1 wherein managing includes:
   switching control to the secondary sensor, if the difference between the primary sensor signal and the estimated road wheel angle is greater than a second threshold; and
   indicating a secondary sensor fault, if the difference between the primary sensor signal and the estimated road wheel angle is not greater than the second threshold.

3. The method of claim 1 wherein calculating the estimated road wheel angle includes:
   utilizing $$m(\dot{V}_y + V_x \Omega_z) = F_{yr} + F_{yf} \cos \delta_f + F_{xf} \sin \delta_f$$

$$I_z \dot{\Omega}_z = l_1 F_{yf} \cos \delta_f - l_2 F_{yr} + l_1 F_{xf} \sin \Omega_f$$

for analytical redundancy, where m is the mass of the vehicle, $V_y$ & $V_x$ are the vehicle velocity components, $F_{yf}$ & $F_{yr}$ are the lateral forces acting on the front and rear tires, $F_{xf}$ is the longitudinal force acting on the front tire, $\Omega_f$ is the steer angle of the front wheel, $\Omega_z$ is the yaw velocity, $I_z$ is the mass moment of inertia of the vehicle about the z axis, and $l_1$ & $l_2$ are the distances between the center of gravity and the front and rear axle respectively; and
   implementing $\delta_f = (\Omega_y/V)(L + K_{us} V^2/g)$, where $L = l_1 + l_2$ and $K_{us}$ is an understeer coefficient of the vehicle by using yaw rate measurements.

4. The method of claim 1 wherein calculating the estimated road wheel angle includes:
   utilizing $$m(\dot{V}_y + V_x \Omega_z) = F_{yr} + F_{yf} \cos \delta_f + F_{xf} \sin \delta_f$$

$$I_z \dot{\Omega}_z = l_1 F_{yf} \cos \delta_f - l_2 F_{yr} + l_1 F_{xf} \sin \Omega_f$$

for analytical redundancy, where m is the mass of the vehicle, $V_y$ & $V_x$ are the vehicle velocity components, $F_{yf}$ & $F_{yr}$ are the lateral forces acting on the front and rear tires, $F_{xf}$ is the longitudinal force acting on the front tire, $\delta_f$ is the steer angle of the front wheel, $\Omega_z$ is the yaw velocity, $I_z$ is the mass moment of inertia of the vehicle about the z axis, and $l_1$ & $l_2$ are the distances between the center of gravity and the front and rear axle respectively; and implementing $\delta_f=(a_y/V^2)(L+K_{us}V^2/g)$, where $a_y$ is vehicle lateral acceleration by using lateral acceleration measurements.

5. The method of claim 1 wherein the step of managing control includes switching control to the secondary sensor and noting that the primary sensor has fault.

6. The method of claim 1 further comprising:
activating the vehicle steer-by-wire system before receiving road wheel angle signals from the primary and secondary sensors; and
initializing the steer-by-wire system before receiving road wheel angle signals from the primary and secondary sensors.

7. The method of claim 1 further comprising:
determining whether the primary sensor signal is within a valid operating window;
switching control to the secondary sensor, if the primary sensor signal is not within the valid operating window;
determining whether the secondary sensor signal is within the valid operating window, if the primary sensor signal is within the valid operating window; and
indicating that the secondary sensor is at fault, if the secondary sensor signal is not within the valid operating window.

8. The method of claim 7 wherein the step of determining whether the primary sensor signal is within the valid operating window is repeated, if the difference between the primary and secondary sensor signals is not greater than the threshold.

9. The method of claim 1 wherein the vehicle variable includes yaw rate or lateral acceleration.

10. The method of claim 1 wherein detecting sensor fault includes:
determining a difference between the road wheel angle signals of the primary and secondary sensor; and
comparing the difference with a threshold.

11. The method of claim 1 wherein calculating the estimated road wheel angle is based on the vehicle variable, if the difference between the road wheel angle signals is greater than the threshold.

12. A method of implementing a fault detection and management strategy for road wheel position sensor faults of a vehicle steer-by-wire system, the method comprising:
providing primary and secondary road wheel position sensors configured to generate road wheel angle signals indicative of a road wheel angle to a microprocessor, the primary road wheel sensor being in an active control mode and the secondary road wheel sensor being in a stand-by control mode within the steer-by-wire system;
receiving road wheel angle signals from the primary and secondary sensors;
determining a difference between the road wheel angle signals of the primary and secondary sensors;
comparing the difference with a threshold;
calculating an estimated road wheel angle based on a vehicle variable, if the difference between the primary and secondary road wheel angle signals is greater than the threshold;
comparing the primary sensor signal with the estimated road wheel angle;
switching control to the secondary sensor, if the difference between the primary sensor signal and the estimated road wheel angle is greater than a second threshold; and
indicating a secondary sensor fault, if the difference between the primary sensor signal and the estimated road wheel angle is not greater than the second threshold.

13. The method of claim 12 wherein calculating the estimated road wheel angle includes:
utilizing $$m(\dot{V}_y+V_x\Omega_z)=F_{yr}+F_{yf}\cos\delta_f+F_{xf}\sin\delta_f$$

$$I_z\dot{\Omega}_z=l_1F_{yf}\cos\delta_f-l_2F_{yr}+l_1F_{xf}\sin\Omega_f$$

for analytical redundancy, where m is the mass of the vehicle, $V_y$ & $V_x$ are the vehicle velocity components, $F_{yf}$ & $F_{yr}$ are the lateral forces acting on the front and rear tires, $F_{xf}$ is the longitudinal force acting on the front tire, $\delta_f$ is the steer angle of the front wheel, $\Omega_z$ is the yaw velocity, $I_z$ is the mass moment of inertia of the vehicle about the z axis, and $l_1$ & $l_2$ are the distances between the center of gravity and the front and rear axle respectively; and implementing $\delta_f=(\Omega_z/V)(L+K_{us}V^2/g)$, where $L=l_{1+l2}$ and $K_{us}$ is the understeer coefficient of the vehicle by using yaw rate measurements.

14. The method of claim 12 wherein calculating the estimated road wheel angle includes:
utilizing $$m(\dot{V}_y+V_x\Omega_z)=F_{yr}+F_{yf}\cos\delta_f+F_{xf}\sin\delta_f$$

$$I_z\dot{\Omega}_z=l_1F_{yf}\cos\delta_f-l_2F_{yr}+l_1F_{xf}\sin\Omega_f$$

for analytical redundancy, where m is the mass of the vehicle, $V_y$ & $V_x$ are the vehicle velocity components, $F_{yf}$ & $F_{yr}$ are the lateral forces acting on the front and rear tires, $F_{xf}$ is the longitudinal force acting on the front tire, $\delta_f$ is the steer angle of the front wheel, $\Omega_z$ is the yaw velocity, $I_z$ is the mass moment of inertia of the vehicle about the z axis, and $l_1$ & $l_2$ are the distances between the center of gravity and the front and rear axle respectively; and implementing $\delta_f=(a_y/V^2)(L+K_{us}V^2/g)$, where $a_y$ is vehicle lateral acceleration by using lateral acceleration measurements.

15. The method of claim 12 wherein the step of switching control to the secondary sensor includes noting that the primary sensor has faulted.

16. The method of claim 12 further comprising:
activating the vehicle steer-by-wire system before receiving road wheel angle signals from the primary and secondary sensors; and
initializing the steer-by-wire system before receiving road wheel angle signals from the primary and secondary sensors.

17. The method of claim 12 further comprising:
determining whether the primary sensor signal is within a valid operating range;
switching control to the secondary sensor, if the primary sensor signal is not within the valid operating range;
determining whether the secondary sensor signal is within the valid operating range, if the primary sensor signal is within the valid operating range; and indicating that the secondary sensor is at fault, if the secondary sensor signal is not within the valid operating range.

18. The method of claim 17 wherein the step of determining whether the primary sensor signal is within the valid operating range is repeated, if the difference between the primary and secondary sensor signals is not greater than the threshold.

19. The method of claim 12 wherein the vehicle variable includes yaw rate or lateral acceleration.

20. A fault detection and management system of a vehicle steer-by-wire system, the system comprising:

primary and secondary road wheel position sensors disposed adjacent to road wheel of the vehicle, the primary and secondary road wheel position sensors being configured to generate road wheel angle signals indicative of a road wheel angle, the primary road wheel position sensor being in an active control mode and the secondary road wheel position sensor being in a stand-by control mode with the steer-by-wire system;

a microprocessor in electrical communication with the primary and secondary road wheel position sensors for receiving road wheel angle signals from the primary and secondary sensors, the microprocessor being configured to calculate an estimated road wheel angle based on a vehicle variable when a sensor fault is detected and to compare one of the primary and secondary sensor signals with the estimated road wheel angle to manage control of the fault detection and management system.

21. The system of claim 20 wherein the vehicle variable includes yaw rate or lateral acceleration.

22. The system of claim 21 wherein the estimated road wheel angle calculation includes:

utilizing $$m(\dot{V}_y + V_x \Omega_z) = F_{yr} + F_{yf} \cos \delta_f + F_{xf} \sin \delta_f$$

$$I_z \dot{\Omega}_z = l_1 F_{yf} \cos \delta_f - l_2 F_{yr} + l_1 F_{xf} \sin \Omega_f$$

for analytical redundancy, where m is the mass of the vehicle, $V_y$ & $V_x$ are the vehicle velocity components, $F_{yf}$ & $F_{yr}$ are the lateral forces acting on the front and rear tires, $F_{xf}$ is the longitudinal force acting on the front tire, $\delta_f$ is the steer angle of the front wheel, $\Omega_z$ is the yaw velocity, $I_z$ is the mass moment of inertia of the vehicle about the z axis, and $l_1$ & $l_2$ are the distances between the center of gravity and the front and rear axle respectively; and implementing $\delta_f = (\Omega_z/V)(L + K_{us} V^2/g)$, where $L = l_1 + l_2$ and $K_{us}$ is the understeer coefficient of the vehicle by using yaw rate measurements.

23. The system of claim 21 wherein the estimated road wheel angle calculation includes:

utilizing $$m(\dot{V}_y + V_x \Omega_z) = F_{yr} + F_{yf} \cos \delta_f + F_{xf} \sin \delta_f$$

$$I_z \dot{\Omega}_z = l_1 F_{yf} \cos \delta_f - l_2 F_{yr} + l_1 F_{xf} \sin \Omega_f$$

for analytical redundancy, where m is the mass of the vehicle, $V_y$ & $V_x$ are the vehicle velocity components, $F_{yf}$ & $F_{yr}$ are the lateral forces acting on the front and rear tires, $F_{xf}$ is the longitudinal force acting on the front tire, $\delta_f$ is the steer angle of the front wheel, $\Omega_z$ is the yaw velocity, $I_z$ is the mass moment of inertia of the vehicle about the z axis, and $l_1$ & $l_2$ are the distances between the center of gravity and the front and rear axle respectively; and implementing $\delta_f = (a_y/V^2)(L + K_{us} V^2/g)$, where $a_y$ is the vehicle lateral acceleration by using lateral acceleration measurements.

24. The system of claim 21 wherein the vehicle variable includes yaw rate or lateral acceleration.

25. The system of claim 20 wherein the microprocessor is configured to determine a difference between the road wheel angel signals of the primary and secondary sensors and compare the difference with a threshold.

26. The system of claim 20 wherein the microprocessor is configured to calculate the estimated road wheel angle, when the difference between the road wheel angle signal is greater than the difference threshold.

27. The system of claim 20 wherein the microprocessor implements fault management by being configured to switch control to the secondary sensor, if the difference between the primary sensor signal and the estimated road wheel angle is greater than a second threshold and indicate a secondary sensor fault, if the difference between the primary sensor signal and the estimated road wheel angle is not greater than the second threshold.

* * * * *

UNITED STATES PATENT AND TRADEMARK OFFICE
CERTIFICATE OF CORRECTION

PATENT NO.     : 6,640,167 B1
DATED          : October 28, 2003
INVENTOR(S)    : Deanna L. Carroll et al.

It is certified that error appears in the above-identified patent and that said Letters Patent is hereby corrected as shown below:

Column 6,
Line 56, delete "$\Omega_y$" and substitute -- $\Omega_z$ -- in its place.
Line 46, delete "$L=l_{1+l2}$" and substitute -- $L=l_1+l_2$ -- in its place.

Signed and Sealed this

Thirteenth Day of April, 2004

JON W. DUDAS
*Acting Director of the United States Patent and Trademark Office*